United States Patent [19]

Dykema et al.

[11] Patent Number: 5,417,614
[45] Date of Patent: May 23, 1995

[54] VARIABLE LENGTH SHAFT ASSEMBLY

[75] Inventors: Michael A. Dykema, Birch Run; Terry E. Burkhard, Bay City, both of Mich.

[73] Assignee: General Motors Corporation, Detroit, Mich.

[21] Appl. No.: 212,091

[22] Filed: Mar. 14, 1994

[51] Int. Cl.⁶ .............................................. B62D 1/19
[52] U.S. Cl. .................................... 464/162; 464/180; 280/777; 74/492; 403/269
[58] Field of Search ............... 280/775, 777, 771, 779, 280/780; 464/162, 180, 181; 74/492, 493; 403/266, 267, 269

[56] References Cited

U.S. PATENT DOCUMENTS

| | | | |
|---|---|---|---|
| 3,373,629 | 3/1968 | Wight et al. | 74/492 |
| 3,457,799 | 7/1969 | Lucas et al. | 74/492 |
| 3,473,406 | 10/1969 | Runkle | 74/493 |
| 3,685,369 | 8/1972 | Adams, III | 74/492 |
| 4,337,967 | 7/1982 | Yoshida et al. | 280/777 |
| 4,509,775 | 4/1985 | Arndt | 280/779 |
| 4,833,936 | 5/1989 | Mariani et al. | 74/493 |
| 4,884,469 | 12/1989 | Wrigley | 74/552 |
| 4,911,034 | 3/1990 | Kulczyk et al. | 464/162 X |
| 5,086,661 | 2/1992 | Hancock | 74/493 |

Primary Examiner—Karin L. Tyson
Assistant Examiner—Victor E. Johnson
Attorney, Agent, or Firm—Saul Schwartz

[57] ABSTRACT

A variable length shaft assembly suitable for motor vehicle steering systems including a tubular outer shaft of non-circular cross section and a solid inner shaft of corresponding non-circular cross section telescoped inside of the outer shaft. A U-shaped metal spring is disposed over the solid shaft adjacent an outboard end of the tubular shaft with opposite legs of the spring in sliding engagement on corresponding flat sides of the solid shaft. A monolithic plastic sleeve is in situ molded on the tubular shaft and includes an integral lip closely surrounding the solid shaft. The integral lip captures the relative angular positions of the shafts about a longitudinal centerline of the assembly, i.e. delashes the shafts, defines a slide bearing between the shafts, and rigidly encases the spring. The surfaces of the legs of the spring which bear against the solid shaft are exposed after the sleeve is in situ molded and define wear plates on the integral plastic lip which protect the lip against abrasion.

4 Claims, 2 Drawing Sheets

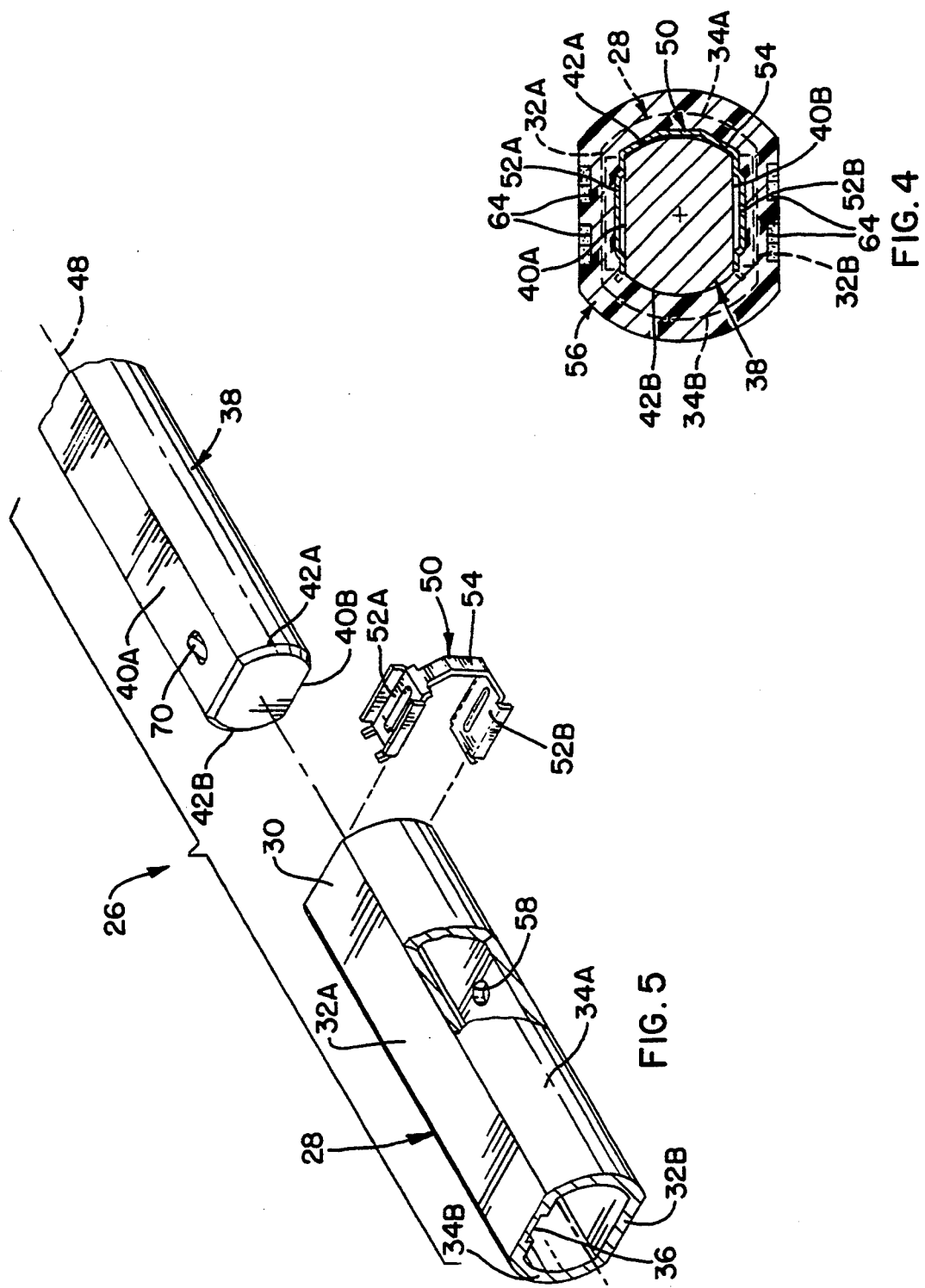

VARIABLE LENGTH SHAFT ASSEMBLY

FIELD OF THE INVENTION

This invention relates to variable length shaft assemblies in motor vehicle steering systems.

BACKGROUND OF THE INVENTION

United States patent application Ser. No. 08/068519, filed 27 May 1993, and now U.S. Pat. No. 5,348,345, assigned to the assignee of this invention, describes a motor vehicle steering system including a pair of variable length shaft assemblies each having a tubular outer shaft of non-circular cross section, a solid inner shaft of corresponding non-circular cross section telescoped inside of the outer shaft, a cavity in the inner shaft defining a spring chamber within the telescopic overlap of the outer shaft, an arched leaf spring in the spring chamber eliminating lateral clearance between the inner and outer shafts, and an in situ injection molded monolithic plastic block in the spring chamber capturing the zero clearance relationship between the inner and the outer shafts and encasing the leaf spring. The plastic block has a low coefficient of friction for minimizing resistance to relative telescopic movement between the inner and the outer shafts. The plastic encased leaf spring has an exposed side slidably engaging the outer shaft and defining a wear plate on the plastic block for maximizing durability. A variable length shaft assembly according to this invention is a novel alternative to the shaft assemblies described in the aforesaid U.S. patent application Ser. No. 08/068519.

SUMMARY OF THE INVENTION

This invention is a new and improved variable length shaft assembly suitable for motor vehicle steering systems including a tubular outer shaft of non-circular cross section and a solid inner shaft of corresponding non-circular cross section telescoped inside of the outer shaft. A U-shaped metal spring is disposed over the solid shaft adjacent an outboard end of the tubular shaft with opposite legs of the spring in sliding engagement on corresponding flat sides of the solid shaft. A monolithic plastic sleeve is in situ molded on the tubular shaft such that inboard of the distal end of the tubular shaft the sleeve is mechanically interlocked thereto and outboard of the distal end an integral lip is defined on the sleeve closely surrounding the solid shaft. The integral lip captures the relative angular positions of the shafts about a longitudinal centerline of the assembly, defines a slide bearing between the shafts, and rigidly encases the spring. The cured plastic from which the sleeve is molded has a low coefficient of friction for minimizing resistance at the slide bearing and high Young's Modulus for maximum rigidity to maintain the relative angular positions of the shafts. The surfaces of the legs of the spring which bear against the solid shaft are exposed after the sleeve is in situ molded and define wear plates on the integral plastic lip which protect the lip against abrasion.

BRIEF DESCRIPTION OF THE DRAWINGS

FIG. 4 is a sectional view taken generally along the plane indicated by lines 4—4 in FIG. 3; and FIG. 5 is a fragmentary, exploded perspective view of a portion of the variable length shaft assembly according to this invention.

DESCRIPTION OF A PREFERRED EMBODIMENT

Figure 1:
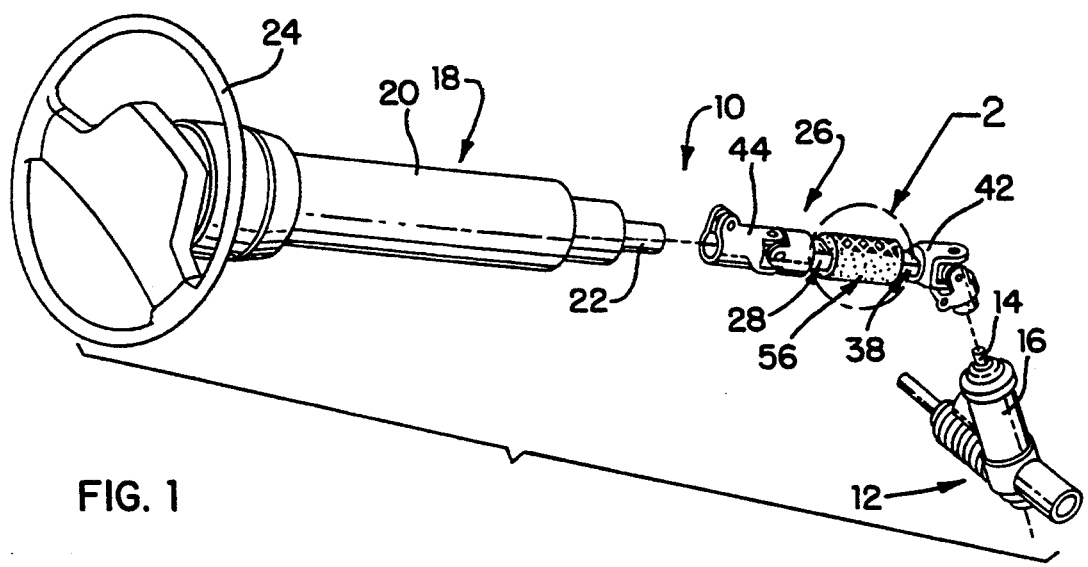
FIG. 1 is a fragmentary perspective view of a motor vehicle steering system including a variable length shaft assembly according to this invention.
Figure 2:
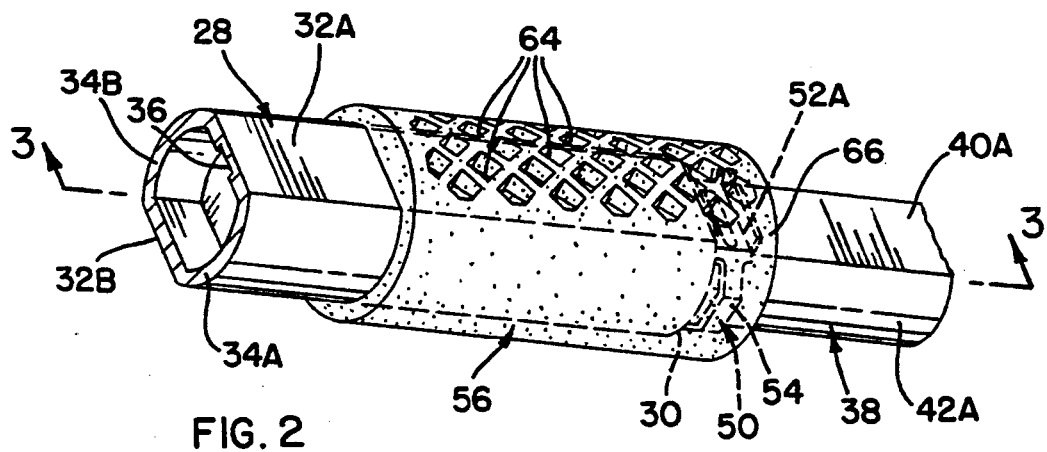
FIG. 2 is an enlarged view of the circled portion of FIG. 1.

Referring to FIG. 1, a fragmentarily illustrated motor vehicle steering system 10 includes a representative steering gear 12 having an input shaft 14 rotatably supported on a housing 16 of the steering gear. The housing 16 is mounted on a motor vehicle, not shown, and contains internal rack and pinion gearing which converts rotation of the input shaft 14 to linear bodily movement of a steering rack, not shown, connected to steerable wheels of the motor vehicle.

A steering column 18 of the steering system 10 includes a tubular mast jacket 20 adapted for attachment to the motor vehicle, a steering shaft 22 rotatably supported on the mast jacket, and a steering wheel 24 rigidly attached to the top of the steering shaft. A lower end of the steering shaft 22 protrudes beyond the mast jacket and is connected to the input shaft 14 of the steering gear 12 by a variable length intermediate shaft assembly 26 according to this invention.

A tubular outer shaft 28 of the intermediate shaft assembly 26 terminates at one end at a distal end 30 and has a pair of flat sides 32A-B, a pair of arcuate sides 34A-B, and an internal groove 36 in the flat side 32A. A solid inner shaft 38 of the shaft assembly 26 has a pair of flat sides 40A-B and a pair of arcuate sides 42A-B. The tubular shaft 28 is connected to the lower end of the steering shaft 22 by a first universal joint 44. The solid shaft 38 is connected to the input shaft 14 of the steering gear 12 by a second universal joint 42.

The solid shaft 38 is telescoped inside the tubular shaft 28 with the flat sides 40A-B of the solid shaft facing, in freely sliding relationship, the flat sides 32A-B of the tubular shaft so that the length of the intermediate shaft assembly in the direction of a centerline 48, FIG. 5, of the shaft assembly 26 is variable. Such variability accommodates length reduction of the shaft assembly necessary to install it and continuous telescopic excursions between the tubular and solid shafts of lesser amplitude and in both directions occurring during normal operation of the vehicle.

The tubular and solid shafts have corresponding non-circular cross sections in planes perpendicular to the centerline 48. Relative rotation between the shafts about the centerline 48 is limited by interference engagement of the flat sides 32A-B of one shaft against the flat sides 40A-B of the other shaft. The angle through which the shafts are rotatable relative to each other is commonly referred to as "lash" and results from clearance between the shafts necessary to achieve unrestricted telescopic excursions and economical manufacture.

As seen best in FIG. 5, the variable length shaft assembly 26 further includes a U-shaped metal spring 50 having a pair of parallel legs 52A-B interconnected by a flexible web 54. Each leg 52A-B is channel-shaped in cross section, FIG. 3, and includes a wide flat side and a pair of narrow flanges perpendicular to the flat side. In an unflexed condition of the spring, FIG. 5, the span between the open ends of the legs 52A-B is less than the span across the solid shaft 38 between the flat sides 40A-B thereof.

The spring 50 is installed on the solid shaft 38 immediately adjacent the distal end 30 of the tubular shaft 28 after the solid shaft is telescoped into the tubular shaft. The spring is pushed over the solid shaft until the web 54 abuts the arcuate side 42A of the shaft. In that position, the resilience of the flexed web 54 holds the flat sides of the legs 52A-B of the spring against the flat sides 40A-B of the solid shaft with a flange of one leg covering the exposed end of the groove 36 in the tubular shaft, FIG. 3.

Figure 3:
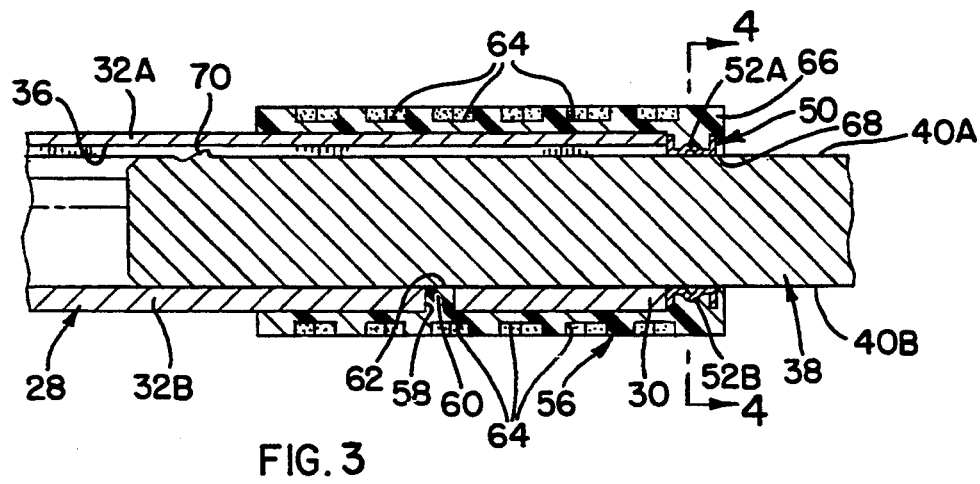
FIG. 3 is a sectional view taken generally along the plane indicated by lines 3—3 in FIG. 2.

After the spring 50 is installed, a monolithic plastic sleeve 56 is in situ molded over the tubular shaft 28 for a distance inboard of the distal end 30 thereof sufficient to overlap a bore 58, FIGS. 3 and 5, in the flat side 32B of the tubular shaft and outboard of the distal end 30 for a distance sufficient to fully encase the spring 50 in plastic. In the molding process, liquid plastic is introduced into a mold cavity, not shown, surrounding the tubular and solid shafts such that the liquid plastic surrounds portions of both shafts and migrates into the bore 58 and completely around the spring 50 except where the flat sides of the legs 52A-B of the spring are held flush against the flat sides 40A-B of the solid shaft. The flange covering the end of groove 36 prevents any significant migration of the liquid plastic into the groove.

The cure rate of the plastic is controlled to cause the liquid plastic to solidify as a cylindrical plastic plug 60 in the bore 58 integral with the sleeve 56. The bore 58 and the solidified plastic plug 60 cooperate in preventing dislodgement of the sleeve 56 from the distal end of the tubular shaft and an end 62 of the plug defines a bearing for the flat side 40B of the solid shaft. The sleeve 56 is molded with a plurality of depressions 64 to reduce the effective wall thickness of the sleeve over the flat sides 32A-B of the tubular shaft for optimizing the shrinkage characteristics of the sleeve.

Beyond the distal end 30 of the tubular shaft, the solidified plastic defines an integral lip 66 on the sleeve which rigidly encases the spring 50 and which has an inner wall 68 closely surrounding the solid shaft. Because the inner wall 68 is formed by solidification of liquid plastic against the solid shaft 38, it conforms substantially exactly to the shape of the solid shaft and effectively captures the relative angular positions of the shafts 28,38 with respect to the centerline 48, i.e. "delashes" the shafts. Because the flat sides of the spring legs 52A-B are pressed tightly against the flat sides 40A-B of the solid shaft by the resilient web 54 during introduction of the liquid plastic to the mold cavity, the surfaces of the flat sides bearing directly against the solid shaft are left exposed, i.e. uncovered by plastic, and substantially coplanar with the inner wall 68 after the plastic lip 66 solidifies.

The plastic from which the sleeve 56 is molded is selected to exhibit predetermined physical characteristics after solidification including high Young's Modulus and low coefficient of friction. In a preferred embodiment, 30% glass fiber reinforced, 15% PTFE lubricated, Polyphenylene Sulfide Resin was found to be an acceptable material.

The low friction characteristic of the cured plastic contributes to smooth sliding of the solid shaft at the bearing defined where the inner wall 68 of the plastic lip engages the solid shaft. The high Young's Modulus characteristic of the cured plastic affords the plastic lip 66 maximum resistance against distortion under torsional loads encountered when a driver steers the motor vehicle with the steering wheel 24. High Young's Modulus also maintains the exposed flat sides of the legs 52A-B of the encased spring 50 coplanar with the inner wall 68 so that the exposed flat sides define effective wear plates which protect the inner wall of the lip against abrasion during continuous telescopic excursions of the solid shaft 38 relative to the tubular shaft 28.

Before the solid shaft is inserted in the tubular shaft, an abutment 70, FIGS. 3 and 5, is upset in the flat side 40A of the solid shaft. The abutment 70 is located for registry with the groove 36 in the tubular shaft. After the solid shaft is telescoped into the tubular shaft and the sleeve 56 molded in situ on the tubular shaft, the flange on the spring leg 52A blocking the end of the groove 36 interferes with the abutment 70 to prevent dislodgement of the solid shaft.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a variable length shaft assembly including
   a tubular shaft terminating at a distal end thereof having a non-circular cross section in a plane perpendicular to a longitudinal centerline of said tubular shaft and a flat side parallel to said longitudinal centerline,
   a solid shaft disposed in said tubular shaft for telescopic bodily movement relative thereto in the direction of said longitudinal centerline having a non-circular cross section in a plane perpendicular to said longitudinal centerline corresponding to said non-circular cross section of said tubular shaft and a flat side parallel to said longitudinal centerline,
   said solid shaft being rotatable relative to said tubular shaft about said longitudinal centerline through a lash angle limited by interference between said flat side on said tubular shaft and said flat side on said solid shaft,
   the improvement comprising:
   a plastic sleeve molded in situ on said tubular shaft when said solid shaft is disposed therein including a first portion of said sleeve inboard of said distal end of said tubular shaft mechanically interlocked thereto with respect to relative rotation between said sleeve and said tubular shaft about said longitudinal centerline and an integral second portion of said sleeve outboard of said distal end of said tubular shaft defining a lip of said sleeve having an inner wall closely surrounding and forming a slide bearing for said solid shaft and concurrently preventing relative rotation between said solid and said tubular shafts through said lash angle,
   means on said tubular shaft and on said first portion of said sleeve operative to prevent dislodgement of said sleeve from said distal end of said tubular shaft, and
   means defining a metal wear plate on said inner wall of said lip of said plastic sleeve slidably engaging said flat side of said solid shaft for minimizing abrasion of said inner wall during relative telescopic bodily movement between said tubular and said solid shafts.

2. The variable length shaft assembly recited in claim 1 wherein said means defining a metal wear plate on said inner wall of said lip of said plastic sleeve slidably engaging said flat side of said solid shaft includes:

a metal spring mounted on said solid shaft adjacent said distal end of said tubular shaft before said sleeve is in situ molded thereon having a leg with a flat side resiliently pressed against said flat side of said solid shaft, said spring being rigidly encased in said lip of said plastic sleeve except for said flat side of said leg resiliently pressed against said flat side of said solid shaft and remaining exposed to said solid shaft in said inner wall of said lip after said sleeve is in situ molded on said tubular shaft.

3. The variable length shaft assembly recited in claim 2 wherein said means on said tubular shaft and on said first portion of said sleeve operative to prevent dislodgement of said sleeve from said distal end of said tubular shaft includes:

a plug on said sleeve formed integrally therewith in a bore in said tubular shaft when said sleeve is in situ molded on said tubular shaft.

4. In a variable length shaft assembly including a tubular shaft terminating at a distal end thereof having a non-circular cross section in a plane perpendicular to a longitudinal centerline of said tubular shaft and a pair of flat sides parallel to said longitudinal centerline, a solid shaft disposed in said tubular shaft for telescopic bodily movement relative thereto in the direction of said longitudinal centerline having a non-circular cross section in a plane perpendicular to said longitudinal centerline corresponding to said non-circular cross section of said tubular shaft and a pair of flat sides parallel to said longitudinal centerline, said solid shaft being rotatable relative to said tubular shaft about said longitudinal centerline through a lash angle limited by interference between said pair of flat sides on said tubular shaft and said pair of flat side on said solid shaft, the improvement comprising:

a U-shaped metal spring including a flexible web interconnecting a pair of parallel legs of said spring each having a flat side, said spring having an unflexed span between said legs less than a span between said parallel flat sides of said solid shaft so that said flat sides of said parallel legs are resiliently biased against corresponding ones of said flat sides of said solid shaft when said spring is pushed onto said solid shaft adjacent said distal end of said tubular shaft, a plastic sleeve molded in situ on said tubular shaft when said solid shaft is disposed therein including a first portion of said sleeve inboard of said distal end of said tubular shaft mechanically interlocked thereto with respect to relative rotation between said sleeve and said tubular shaft about said longitudinal centerline and an integral second portion of said sleeve outboard of said distal end of said tubular shaft defining a lip of said sleeve rigidly encasing said metal spring and having an inner wall closely surrounding and forming a slide bearing for said solid shaft and concurrently preventing relative rotation between said solid and said tubular shafts through said lash angle, said spring being rigidly encased in said lip of said plastic sleeve except for said flat sides of said legs resiliently pressed against said flat sides of said solid shaft and remaining exposed to said solid shaft in said inner wall of said lip after said sleeve is in situ molded on said tubular shaft and thereby defining a pair of metal wear plates on said inner wall of said lip of said plastic sleeve, and means on said tubular shaft and on said first portion of said sleeve operative to prevent dislodgement of said sleeve from said distal end of said tubular shaft.

* * * * *